(12) United States Patent  (10) Patent No.: US 7,634,297 B2
Sin  (45) Date of Patent: Dec. 15, 2009

(54) MULTIPLE CARD-LOADING SOCKET FOR A MOBILE COMMUNICATION TERMINAL

(75) Inventor: Man Soo Sin, Seoul (KR)

(73) Assignee: LG Electronics Inc., Seoul (KR)

( * ) Notice: Subject to any disclaimer, the term of this patent is extended or adjusted under 35 U.S.C. 154(b) by 169 days.

(21) Appl. No.: 11/199,949

(22) Filed: Aug. 8, 2005

(65) Prior Publication Data

US 2006/0030361 A1    Feb. 9, 2006

(30) Foreign Application Priority Data

Aug. 9, 2004  (KR) .................. 10-2004-0062471

(51) Int. Cl.
*H04B 1/00*       (2006.01)
(52) U.S. Cl. .................. 455/558; 455/575.1; 455/550.1
(58) Field of Classification Search .................. 455/558, 455/575.1, 550.1, 90.3; 312/9.1
See application file for complete search history.

(56) References Cited

U.S. PATENT DOCUMENTS

| 5,933,328 | A |   | 8/1999 | Wallace et al. |
| 6,062,887 | A | * | 5/2000 | Schuster et al. ............ 439/2.18 |
| 6,724,618 | B1 | * | 4/2004 | Jenkins et al. .............. 361/684 |
| 7,346,371 | B2 | * | 3/2008 | Tomatsu ..................... 455/558 |
| 2002/0065001 | A1 |   | 5/2002 | Sun |
| 2003/0153356 | A1 | * | 8/2003 | Liu ............................ 455/558 |

FOREIGN PATENT DOCUMENTS

| CN | 1326284 | 12/2001 |
| EP | 1244 178 A2 | 9/2002 |
| EP | 1308874 A2 | 6/2003 |
| EP | 1308874 A3 | 11/2003 |
| EP | 1365562 A1 | 11/2003 |
| EP | 1603073 | 7/2005 |
| EP | 1244 178 A3 | 8/2005 |
| GB | 2341259 | 8/2000 |
| JP | 1999-155004 | 6/1999 |
| JP | 2002-117922 | 4/2002 |
| JP | 2002-152354 | 5/2002 |
| JP | 2003-132977 | 5/2003 |
| KR | 10-2002-00868 45 | 11/2002 |
| WO | WO 02/47412 A1 | 6/2002 |

* cited by examiner

*Primary Examiner*—Rafael Pérez-Gutiérrez
*Assistant Examiner*—German Viana Di Prisco
(74) *Attorney, Agent, or Firm*—Lee, Hong, Degerman, Kang & Waimey

(57) ABSTRACT

A mobile communication terminal is disclosed with a card-loading socket for loading a first card and a second card. The mobile communication terminal comprises a socket body disposed in a housing of the mobile communication terminal comprising a first portion with at least one first electrical terminal and a second portion with at least one second electrical terminal. The first portion and the second portion comprise at least one recessed area within the socket body. The at least one first terminal is operatively connected to the first card. The at least one second terminal, located a predetermined distance from the at least one first terminal, is operatively connected to the second card.

17 Claims, 7 Drawing Sheets

MULTIPLE CARD-LOADING SOCKET FOR A MOBILE COMMUNICATION TERMINAL

CROSS-REFERENCE TO RELATED APPLICATIONS

This application claims the benefit of Korean Application No. 10-2004-0062471, filed on Aug. 9, 2004, which is hereby incorporated by reference as if fully set forth herein.

FIELD OF THE INVENTION

The present invention relates to a mobile communication terminal, and more particularly, to a card-loading socket and mobile communication terminal using the same for loading memory devices in a space efficient manner.

BACKGROUND OF THE INVENTION

Discussion of the Related Art

Recently, technological developments of mobile communication devices, such as mobile phones and personal digital assistants (PDAs) and the like, provide character information, image information, games and the like for a user in addition to communicating voice information. More recently, a mobile communication terminal is provided with audio playback functionality for playing audio files, such as MP3 files and the like, and a digital camera function for capturing digital photos and videos. Hence, the scope of usage of the mobile communication terminal is expanding to become a necessity of life.

Furthermore, this expansion has resulted in a smart card that may be integrated into or detachably connected to a mobile communication terminal to functionally converge use of the smart card and the mobile communication terminal so as to eliminate the need for a separate, plastic smart card.

Referring to FIG. 1, a related art commerce-phone 1 illustrates integration of a smart cart and a mobile communication terminal. As shown, a smart card 3 is loaded in a card-loading socket 2 disposed on a rear side of a body 1 of a mobile communication terminal. The smart card stores user authentication information such as credit card particulars, passbook information, and the like; thus, the commerce-phone may transact business having financial associations and act as an electronic passbook for transactions, such as account inquiries, money wiring, cash-outs, check inquiries and the like. Moreover, the commerce phone may provide additional functionality such as acting as a transportation or credit card. Moreover, by applying a communication module, such as an infrared data transmission sensor and module to the commerce-phone, a smart card payment may be performed via a wireless communication link.

The integration of the smart card and mobile communication terminal allows the smart card to act as a subscriber identity module to provide a roaming service for the mobile communication terminal. Smart cards come in many varieties. Some examples of a smart card include a SIM (subscriber identity module) card, USIM (universal subscriber identity module) card, UIM (user identity module) card, RUIM (removable user identity module) card, etc.

With increased functionality, the mobile communication terminal requires increase storage capacity. For instance, in case of a mobile phone provided with a digital camera that stores images and/or provides MP3 player functionality, mobile phones need additional memory capacity to the intrinsic storage capacity to store photograph data and MP3 files.

Yet, if a high capacity memory is built into a body of a mobile communication terminal to store a high volume of data, the price of the terminal is increased. However, a terminal without this increased memory capacity would provide little use to a user with an increased functionality mobile terminal.

Instead of providing a built-in, high-capacity memory in a mobile communication terminal 7, a memory card-loading socket 4, as shown in FIG. 1, is separately provided to a body 1 of the related art mobile communication terminal 7. Hence, a memory card 5 may be detachably attached according to a user's requirements.

There are various types of memory cards. One type of memory card employs flash memory. For instance, some examples of flash memory cards include a secure digital (SD) card, memory stick (MS) card, smart media card (SMC), compact flash card (CFC), multimedia card (MMC), etc.

In accordance with expanding and diversifying functions of the related art mobile communication terminal, a smart card-loading socket may be provided for attachment/detachment of various smart cards. In addition, a memory card-loading socket may be provided for attachment/detachment of a memory card. In these related art mobile terminals, a user loads a card fit for a specific purpose in the corresponding card-loading socket.

If two separate card-loading sockets, e.g. a smart card socket and a memory card socket are provided to one mobile communication terminal, this design configuration may produce a non-compact, and non-miniaturized mobile communication terminal. Furthermore, having two separate card-loading sockets may increase the manufacturing cost for terminal production.

Furthermore, if the related art terminal only provides one socket, only one of the smart card or the memory card may be loaded. Thus, the functionality of the terminal may suffer if it is required that both the smart card and memory card be simultaneously loaded.

SUMMARY OF THE INVENTION

Accordingly, the present invention is directed to a card-loading socket and mobile communication terminal using the same that substantially obviate one or more problems due to limitations and disadvantages of the related art.

An object of the present invention is to provide a card-loading socket for a mobile communication terminal in which multiple cards, preferably one of a memory card and a smart card, e.g., SIM card, are detachably attached within a socket to minimize the occupied space.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In one embodiment, a mobile communication terminal is disclosed with a card-loading socket for loading a first card and a second card. The mobile communication terminal comprises a socket body disposed in a housing of the mobile communication terminal comprising a first portion with at least one first electrical terminal and a second portion with at least one second electrical terminal. The first portion and the second portion comprise at least one recessed area within the socket body.

Preferably, the at least one first terminal is operatively connected to the first card.

Preferably, the at least one second terminal, is located a predetermined distance from the at least one first terminal, is operatively connected to the second memory card.

In a second embodiment, a mobile communication terminal receives a first card and a second card. The mobile communication terminal comprises a housing and a first loading portion disposed on a surface of the housing to detachably receive the first card. Preferably, a second loading portion is disposed on the surface of the housing in parallel to the first loading portion to detachably receive the second card. A main board, in alternative embodiment, may be provided within the housing.

The card-loading socket preferably comprises a first terminal exposed to the first loading portion to contact the first card. A second terminal may also be provided that is arranged parallel to the first terminal to detachably receive the second loading portion and to contact the second card.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a better understanding of the invention and are incorporated in and constitute a part of this application, illustrate embodiment(s) of the invention and together with the description serve to explain the principles of the present invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

FIGS. 2 through 4B illustrate configurations of a mobile communication terminal and a card-loading socket provided to the mobile communication terminal in accordance with a first embodiment of the present invention.

Figure 1:
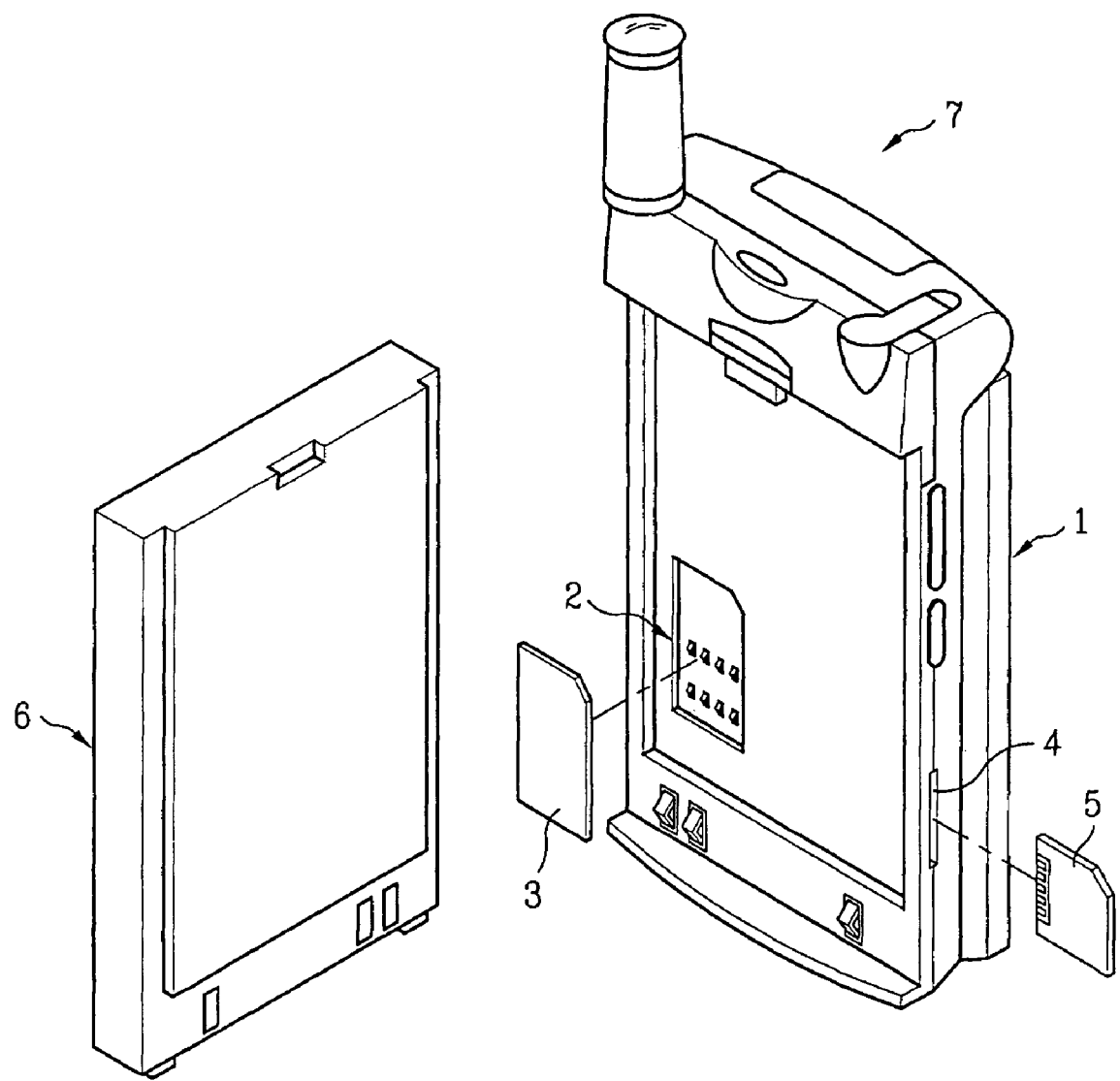
FIG. 1 is an exploded perspective diagram of a related art mobile communication terminal.
Figure 2:
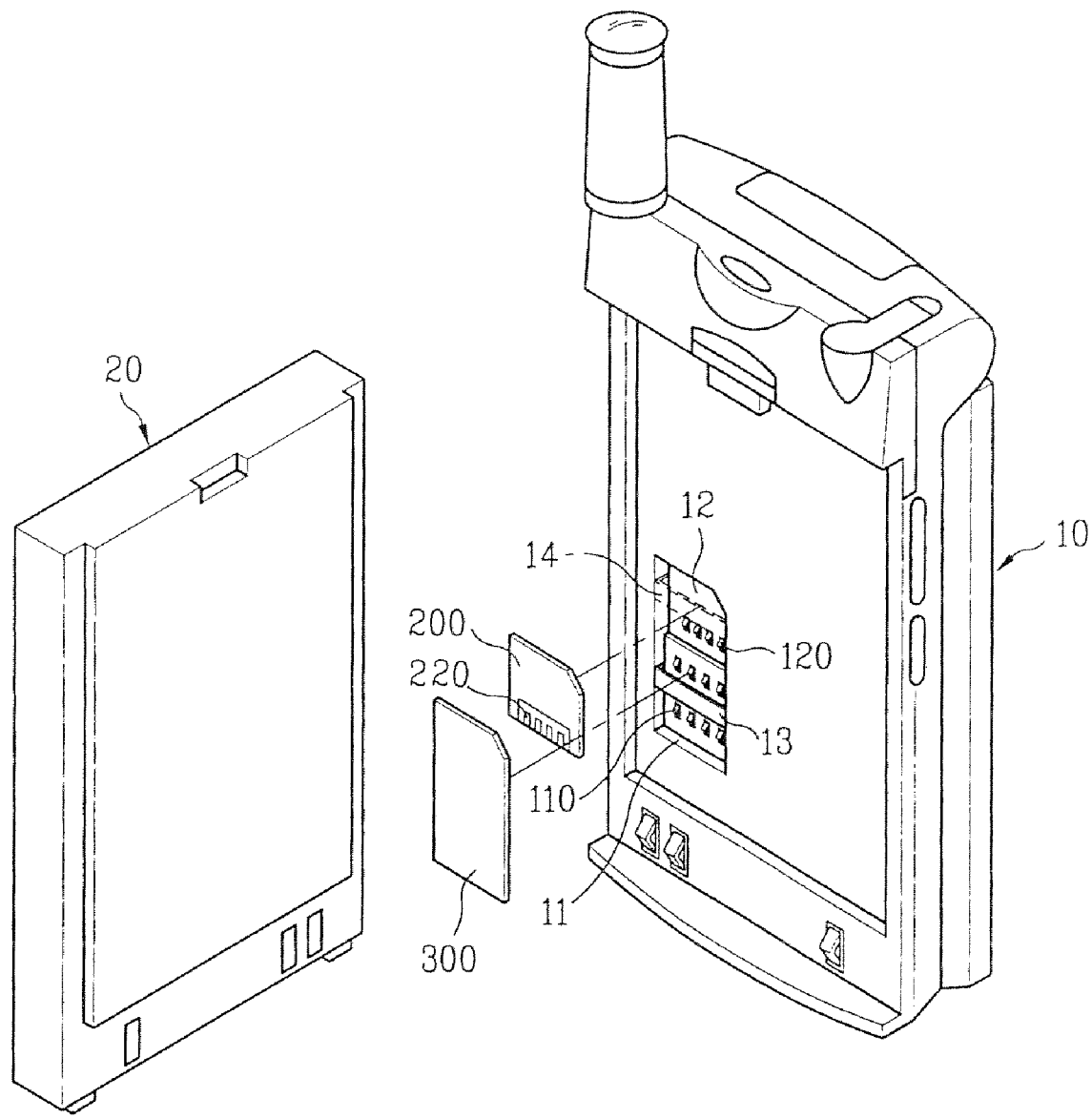
FIG. 2 is an exploded perspective diagram of a mobile communication terminal in accordance with a first embodiment of the present invention.

Referring to FIG. 2, a mobile communication terminal includes a housing 10 and a battery pack 20 detachably connects to the housing 10. In this preferred embodiment, the battery pack 20 detachably connects to one side of the housing, e.g., a rear side of the housing 10. The housing 10 may be provided with the following features, not show in the drawings including: a speaker, a microphone, a signal input/output unit, which may include various keys, buttons and a display, a camera module and the like.

Figure 3:
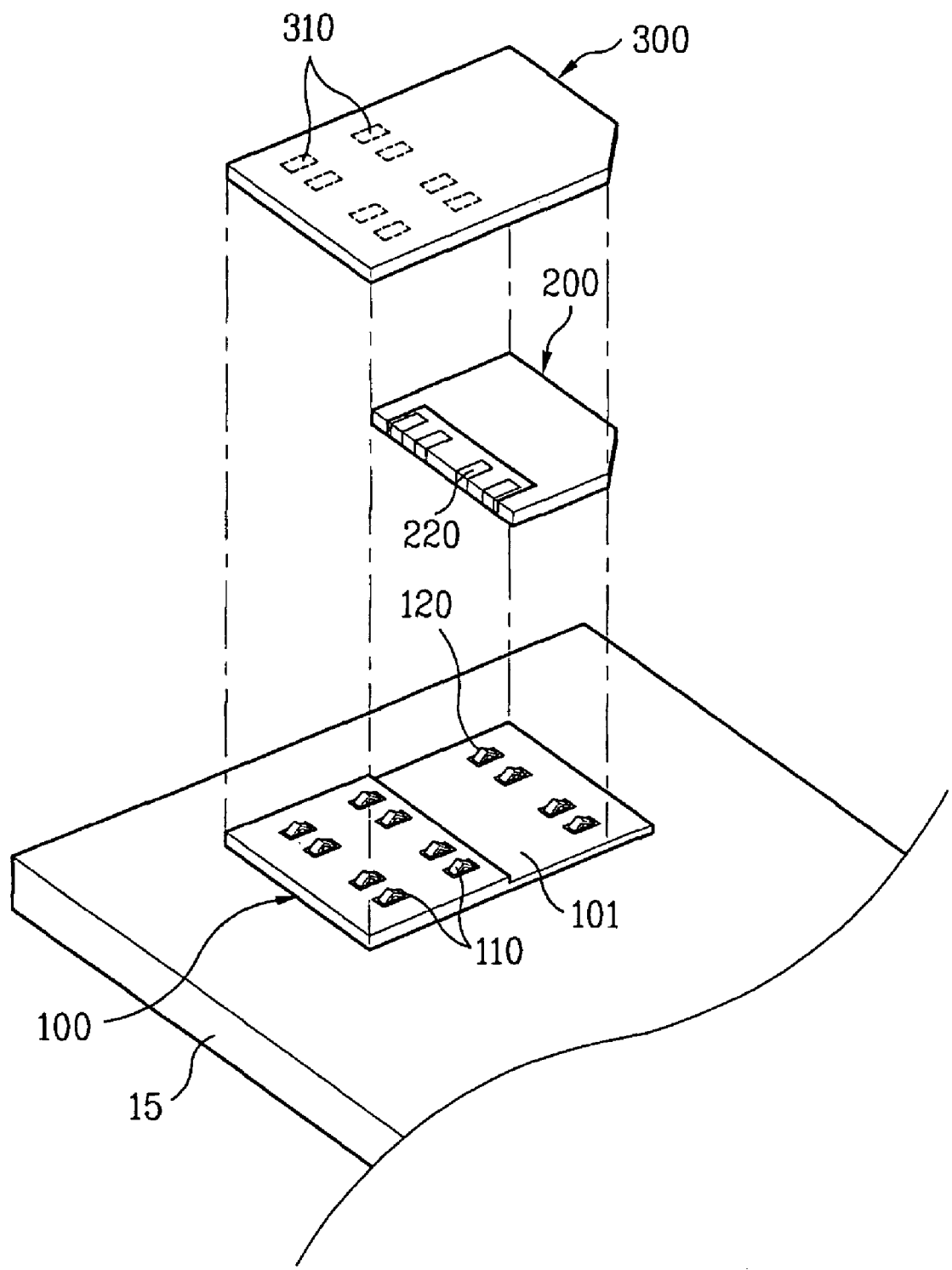
FIG. 3 is an exploded perspective diagram of a card-loading socket, memory and smart card as shown in FIG. 2.

Referring to FIG. 3, a main board 15 which may be electrically connected to a signal input/output unit and a display, not shown, is provided within the housing 10. The main board 15 may further be provided with the following features, not shown in the drawings, including: a control unit, a built-in memory, a mobile communication signal processing unit and the like. The mobile communication signal-processing unit may include a transmission signal-processing unit to transmit a signal or information inputted via the input/output unit or information stored in the built-in memory. In addition, the mobile communication signal processing unit may include a reception signal processing unit, not shown in the drawings, to receive and process a radio signal.

Figure 4A:
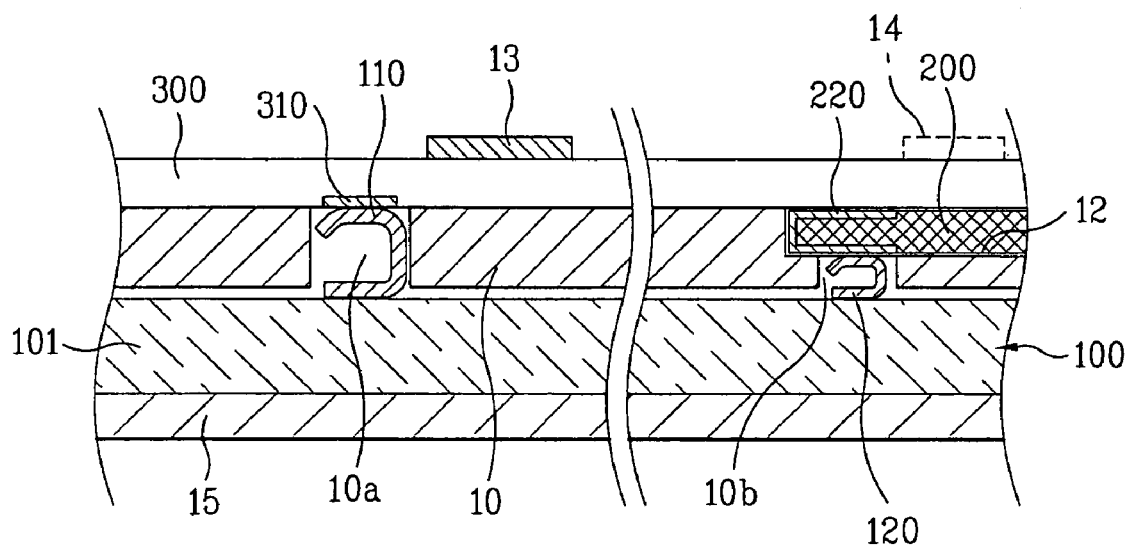
FIG. 4A and FIG. 4B are cross-sectional diagrams of the card-loading socket which is shown in FIG. 2, where the memory and smart cards are loaded in the card-loading socket in accordance with the first embodiment of the present invention.
Figure 4B:
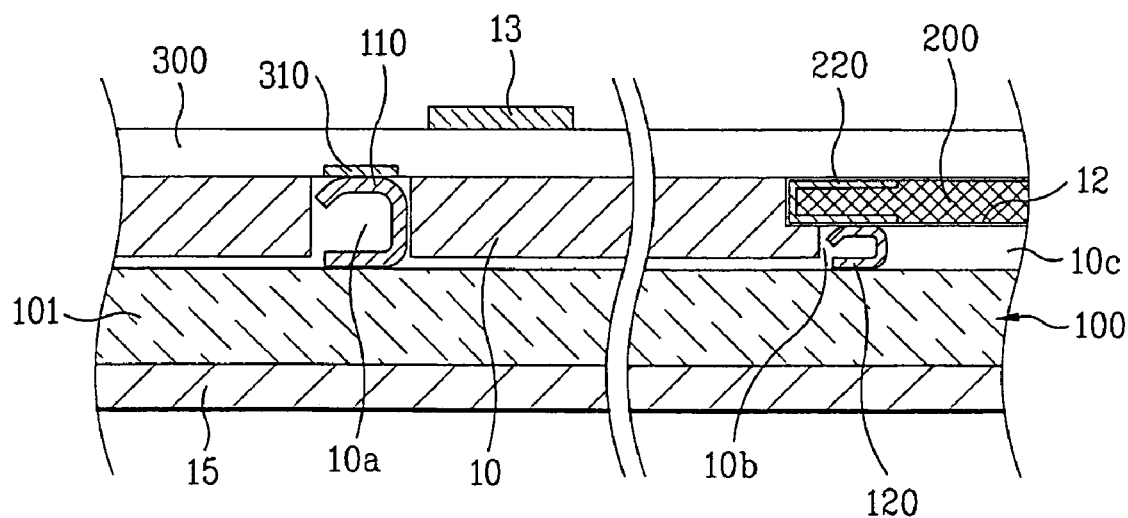

Referring to FIGS. 3 and 4B, a card-loading socket 100 is preferably mounted on the main board 15. A smart card 300 and an external memory card 200 (referred to hereinafter as memory) may be both detachably received in the card-loading socket 100. In one embodiment of the present invention, the card-loading socket 100 is mounted on the main board 15 and the housing 10 enables the smart card 300 and the memory card 200 to be received by the card-loading socket 100 to reduce space required for a mobile terminal.

The card-loading socket 100 is further provided with a first terminal 110 and a second terminal 120 to contact and secure the smart card 300 and the memory card 200. A socket body 101, disposed on the card-loading socket, houses and supports the first terminal 110 and the second terminal 120. The socket body 101, in one preferred embodiment, mounts on the main board 15. The first terminal 110 extends from a first surface of the socket body 101, e.g., a lower surface of the socket body 101. The second terminal 120 extends from the first surface of the socket body 101, e.g., an upper surface of the socket body 101.

In one preferred embodiment, the first terminal 110 and the second terminal 120 are disposed so that a predetermined distance separates them. In one alternative of this preferred embodiment, the first and second terminals 110 and 120, as shown in FIG. 3, are arranged parallel to each other. Each of the first terminal 110 and the second terminal 120 are exposed to an outer surface of the housing 10, e.g., the rear side of the housing 10 to which the battery pack 20 is attached.

The smart card 300 is loaded as a subscriber identity module on the housing 10. For example, the smart card 300 may be a SIM (subscriber identity module) card, USIM (universal subscriber identity module) card, UIM (user identity module) card, RUIM (removable user identity module) card, or etc., manufactured to communicate signals using a digital standard. In addition, the size of the smart card 300 and the number and positions of contact terminals 310, which are arranged on a surface of the smart card 30, may be disposed so as to match a digital standard. Furthermore, the number and positions of the first terminals 110 contacting with the contact terminals 310 of the smart card 300 may be formed according to the standard specification determined by various companies and specification providers.

The memory card 200, for example, may be any of the following: a flash memory which fits into a secure digital (SD) card, a memory stick (MS) card, a smart media card (SMC), a compact flash card (CFC), a multimedia card (MMG), or the like. Preferably, different sockets may be provided depending on the type of memory card being used.

A size of the memory card 200 and the number and positions of the contact terminals 220 of the memory card 200 may differ depending on the need.

In one preferred embodiment, the first terminal 110 may be provided according to one telecommunication standard. The second terminal 120 may be provided at a differing position and/or number of connection ports from the first terminal 110, in accordance with the standard of a selected memory card 200. Preferably, one standard memory card 200 is selected and inserted into the card-loading socket 100 designed to receive such selected standard memory card 200.

Referring to FIG. 3, in the first embodiment, a width and a length of the socket body 101 is similar to that of the smart card 300. In this preferred embodiment, the memory card 200 that is smaller in size than the smart card 300 is preferentially loaded in the socket body 101. The smart card 300 is loaded into the socket body 101 to support and to secure the memory card 200. The first terminal 110 contacts the contact terminal 310 of the smart card 300. The second terminal 120, proximally located to the first terminal 110, contacts the contact terminal 220 of the memory card 200.

To load the smart card 300 and memory card 200 on the card-loading socket 100, the housing 10 is provided with a first loading portion and a second loading portion. The first and second loading portions are configured so that the smart card 300 insets into the socket body 101 to secure the memory card 200 inserted into the socket body 101. This configuration is explained in detail with reference to FIG. 2, FIG. 3A and FIG. 3B.

Referring again to FIG. 2, the first loading portion, in which the smart card 300 is inserted, is disposed on one surface of the housing 10, e.g., a rear surface of the housing 10 to which, for example, a battery pack 20 is attached. The first loading portion includes a recess, e.g., a first loading recess 11, disposed within a rear surface of the housing 10. In one preferred embodiment, the first loading recess 11 has a similar shape as that of the smart card 300. More preferably, a width and length of the first loading recess 11 are formed slightly greater than those of the smart card 300. In another preferred embodiment, a depth of the first loading recess 11 is equal to or greater than a thickness of the smart card 300.

The first terminal 110 of the card-loading socket 100 is exposed to the first loading recess 11. In particular, the first terminal 110, as shown in FIG. 2, penetrates a bottom of the first loading recess 11, e.g., an upper concave recess, that is exposed outside the housing 10. A first terminal 110, as shown in FIG. 4A, extends through a hole 10$a$ in the housing 10. Once the smart card 300 is detachably received within the first loading recess 11, the contact terminal 310 of the smart card 300 contacts the first terminal 110 of the card-loading socket 100 to electrically connect the smart card 300 to the main board 15.

The second loading portion for inserting the memory card 200 is preferably provided next to the first loading portion and communicates with the first loading portion. The second loading portion includes a recess, e.g., a second loading recess 12. In one alternative embodiment, the second loading portion, as shown in FIG. 4B, is an opening 10$c$. The second loading recess 12 is, in this example, a lower concave recess disposed within the first loading portion, e.g., at a bottom of the first loading recess 11.

The second loading recess 12 has a similar shape as that of the memory card 200. Preferably, a width and length of the second loading recess 12 are equal to or slightly greater than those corresponding dimensions of the memory card 200. In one preferred embodiment, a depth of the second loading recess, e.g., depth of the second loading recess 12, is equal to or greater than a thickness of the memory card 200. In yet another preferred embodiment, as shown in FIG. 2, a width of the second loading recess 12 is equal to that of the first loading recess 11. In yet another embodiment, the width of the second loading recess 12 may be less than or greater than those dimensions of the first loading recess 11 in accordance with a size of the memory card 200.

Furthermore, the second terminal 120 of the card-loading socket 100 may be exposed to the above-configured second loading portion, i.e., the second loading recess 12. In one embodiment, the second terminal 120 penetrates a bottom of the second loading recess 12 to be exposed outside the housing 10. In this instance, a hole 10$b$, as shown in FIG. 4A, is provided to the housing 10 for passing through the second terminal 120. Hence, once the memory card 200 is fitted in the second loading portion, i.e., the second loading recess 12, the contact terminal 220 of the memory card 200 contacts the second terminal 120 of the card-loading socket 100 to electrically connect the memory card 200 to the main board 15.

Referring to FIG. 4B, the second loading portion includes the opening 10$c$. The opening 10$c$ has a similar location and shape, as does the second loading recess 12 described above in reference to the discussion of FIG. 2 and FIG. 4A. The opening 10$c$ forms in the exemplary embodiment the second loading portion to perforate the housing 10. Consequently, the opening 10$c$ provides access to the first loading recess 11 located inside of the housing 10 within the main board 15. The memory card 200 is received with the opening 10$c$. The second terminal 120 provides an elastic restorative force to press, in this example upward, to support the memory card 200. Because the smart card 300 supports and secures the memory card 200, the memory card 200 remains within the second loading portion. In one alternative of this embodiment, so as to prevent the second loading portion from entering the housing 10 via a bottom of the opening 10$c$, a protrusion, not shown in the drawing, is provided. The protrusion protrudes from inside of the housing 10 proximal to the opening 10$c$ to support a portion of a lower circumference of the memory card 200.

In one embodiment, the first and second loading portions are provided to one side of the housing 10, e.g., a rear surface of the housing 10, and the battery pack 20 attaches to the rear surface of the housing 10. Consequently, the battery pack 20 is attached to the housing 10 when the smart card 300 and the memory card 200 are inserted into the first and second loading portions, respectively. The battery pack 20, in this embodiment, secures, and more preferably covers, the smart card 300. The smart card secures, and more preferably covers, the memory card 200. In other words, the smart card 300 and the memory card 200 are sandwiched between the battery pack 20 and the housing 10.

In one alternative of this embodiment, fixing members 13 and 14, as shown in FIG. 2, may be utilized to further maintain contact between the smart card 300, the memory card 200, the housing 10 and the battery pack 20. The fixing members 13, 14 extend over the first loading recess 11. The fixing members 13, 14 press on an upper surface of the smart card 300 within the first loading recess 11. The fixing members 13, 14 include a bar arranged to traverse the first loading recess 11.

Preferably, the fixing members 13, 14 traverse along a width of the first loading recess 11 rather than a length-wise direction to facilitate insertion of the smart card 300. The fixing members 13, 14 are preferably disposed with a predetermined distance in-between, along a length-wise direction of the first loading recess 11. The fixing member 14 traverses the second loading portion. In one alternative of this embodiment, the fixing members 13 and 14 may be constructed of various shapes. The fixing members 13, 14 may include protrusions protruding from an upper part of the first loading recess 11 along a width of the first loading recess 11. The protrusions press both edges of the smart card to secure the smart card 300.

After the fixing members 13, 14 are attached, the smart card 300 and the memory card 200 detachably insert, for example by sliding, into the first and second loading portions, respectively with the housing 10. In this preferred embodiment, the smart card 300 is detachably received within an upper wall of the loading recess 11. The memory card 200 is detachably received within the second loading recess 12 or, in the alternative, to an opening 10c, which may be rounded or tilted. Thus, the first and second loading portions allows both the smart card 300 and the memory card 200 to be loaded into the card-loading socket 100 so as to occupy a minimal amount of space. Once the memory card 200 inserts into the second loading recess 12 or, in an alternative embodiment, an opening 10c, an upper surface of the memory card 200 lies in the same plane as the bottom surface of the first loading recess 11. Subsequently, the smart card 300 is attached within the first loading recess 11.

As shown in FIGS. 3 to 4B, the smart card 300 covers the memory card 200. In this case, the width of the second loading recess 12 or opening 10 has the memory card 200 fitted therein. The second loading recess 12, in this exemplary example, is greater than that of the first loading recess 11 so that the smart card 300 partially covers the memory card 200. In another exemplary example, if the width of the second loading recess 12 or opening 10c is less than or equal to that of the first loading recess 11, the smart card 300 completely covers the memory card 200.

While the smart card 300 is inserted into the first loading recess 11, the smart card 300 covers at least partially a portion of the memory card. In this same example, a battery pack 20, as shown in FIG. 2, is attached to the rear surface of the housing 10. A battery pack 20 further pushes against the smart card 300 and the smart card 300 presses against the memory card 200; therefore, the battery pack secures the smart card 3000 and the memory card 200 within the first loading recess 11 and the second loading recess 12 or opening 10c, respectively. In one alternative embodiment, the fixing members 13, 14 secure the smart card 300 and the memory card 200. In this instance, the battery pack 20 covers the smart 300 rather than pressing down on the smart card 300. Thus, the fixing members 13, 14 add stability and robustness to further secure the smart card 300 and the memory card 200.

In the above description, the example of loading both of the memory and smart cards 200 and 300 on the card-loading socket 100 is explained. Alternatively, the card-loading socket 100 may detachably receive one of the memory card 200 and the smart card 300. In this example, the smart card 300 is received within the first loading recess 11 while the second loading recess 12 or opening 10c is empty. Because an area of a bottom surface of the first loading recess 11 is large enough to support the smart card 300, the smart card 300 may be received within the first loading recess 11. The smart card 300 may be loaded after a plate member, which in this exemplary example, has the same shape as that of the memory card 200 disposed in the second loading recess 12 or, in the alternative, opening 10c.

Once the memory card 200 is disposed in the second loading recess 12 or opening 10c, the upper surface of the memory card 200 lies in the same plane of the bottom surface of the first loading recess 11. Consequently, it may be difficult to load the memory card 200 on the second loading recess 12 or opening 10c. A plate member that has the same shape as that of the smart card 300 detachably inserts into the first loading recess 11, the memory card 200 is secured within the card-loading socket 100.

Figure 5:
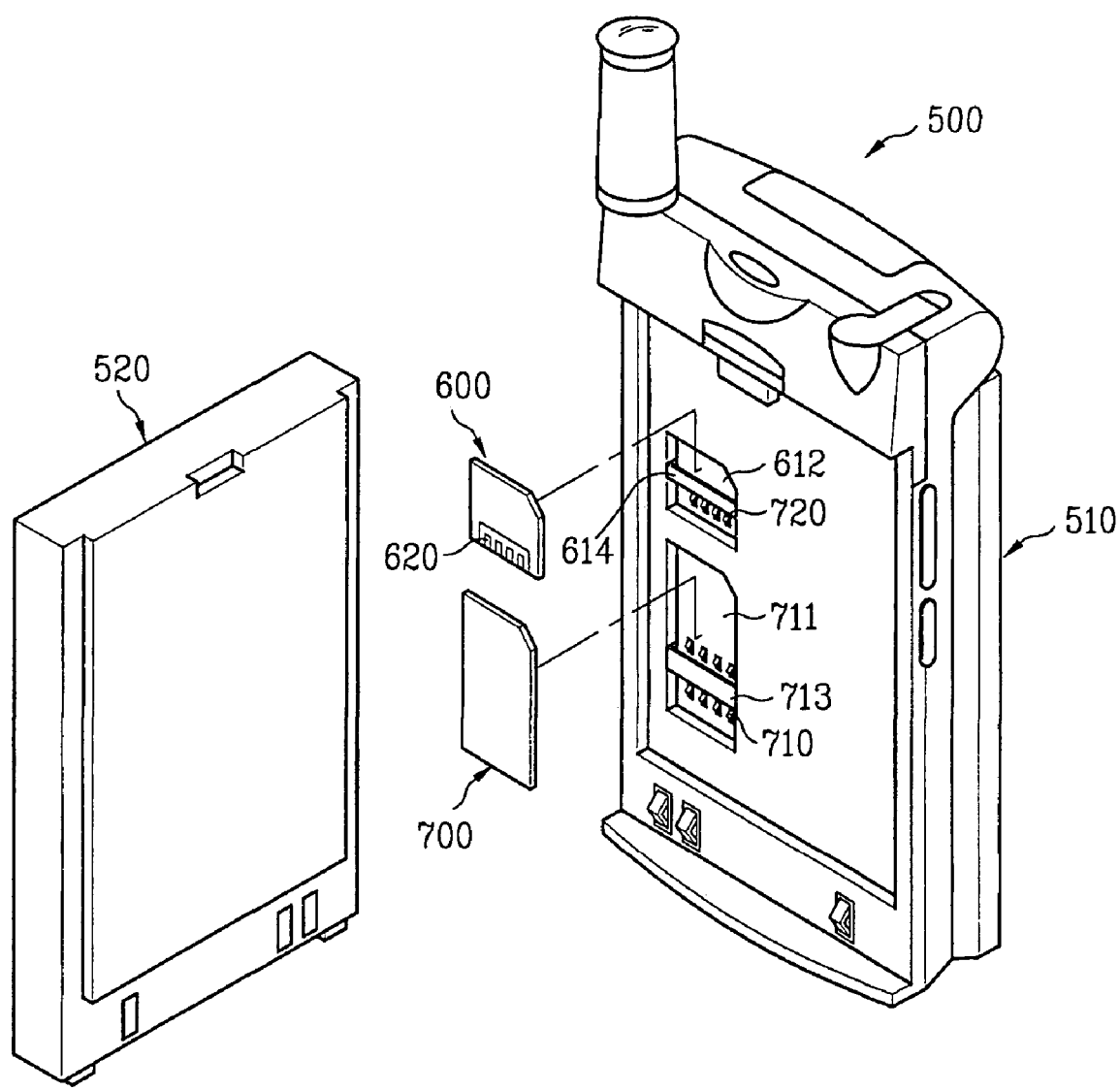
FIG. 5 is an exploded perspective diagram of a mobile communication terminal according to a second embodiment of the present invention.
Figure 6:
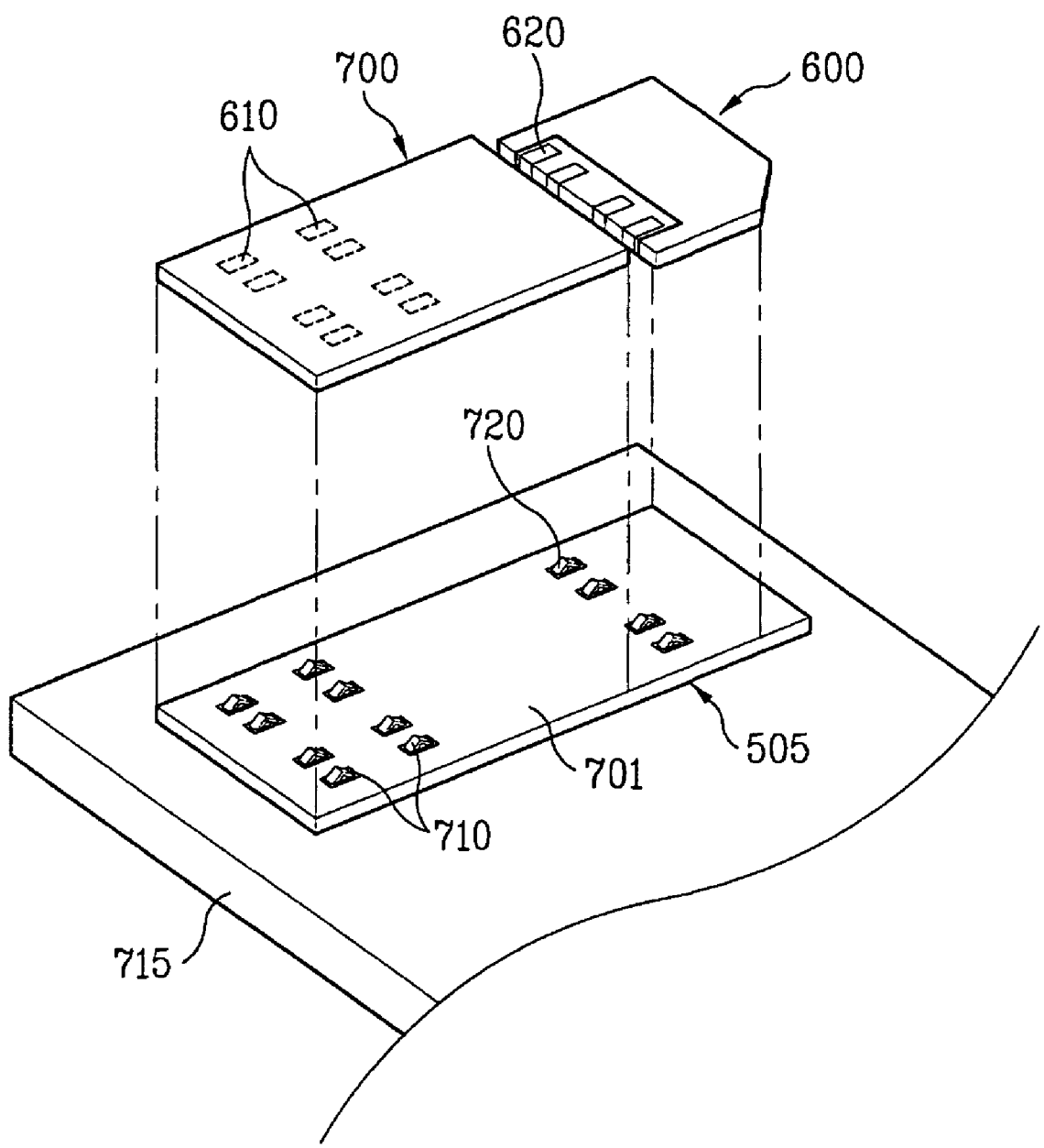
FIG. 6 is an exploded perspective diagram of a card-loading socket, memory card and smart card as shown in FIG. 5.
Figure 7:
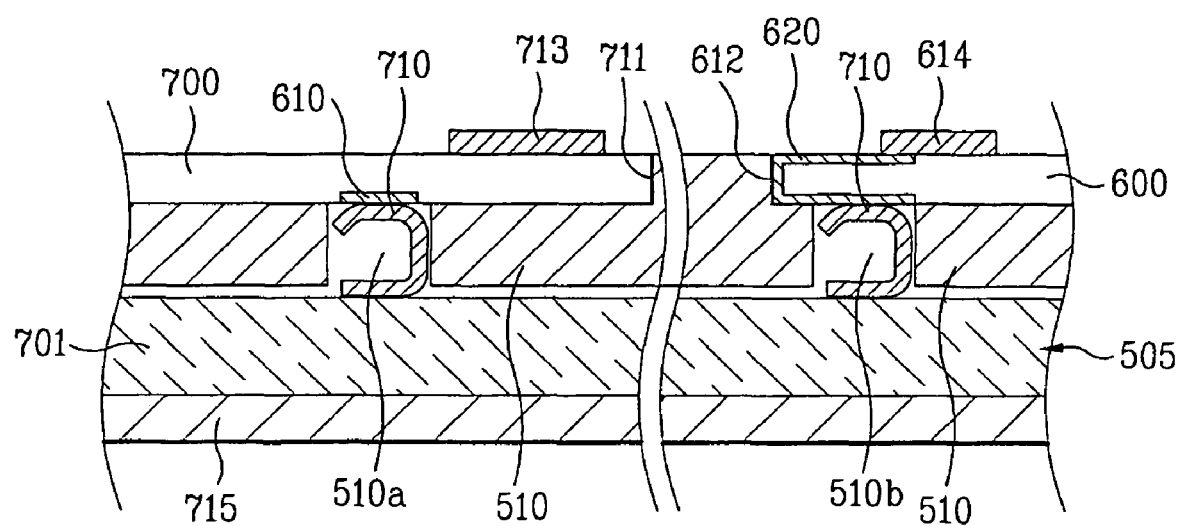
FIG. 7 is a cross-sectional diagram of the card-loading socket as shown in FIG. 5, where the memory card and smart card are inserted into the card-loading socket.

FIGS. 5-7 illustrate a second embodiment of the present invention for a card-loading socket 500. In this second embodiment, the card-loading slot is configured similar to the structure disclosed in FIGS. 2 to 4B.

The attachment structure of memory card 600 and smart card 700 differ from those of the first embodiment in that the card-loading sockets are arranged separate from each other. In this embodiment, the memory card 600 and the smart card 700 are parallel to each other for loading into the card-loading socket and in particular the socket body 701. First and second terminals 710, 720 of the card-loading socket 400 are distally located from one another. A first loading recess 711 is proximally located to the first terminal 710. A second loading portion, i.e., a second recess 612, is proximally located to the second terminal 720. The first and second terminals 710, 720 are arranged parallel to each other along one side of the housing 510, e.g., a rear surface of the housing 510, for attachment to the battery pack 520.

In this preferred embodiment, the first and second terminals 710, 720 are located with a sufficient distance between them to prevent overlap of the smart card 700 and the memory card 600. Thus, the first and second loading recesses 711, 612 are arranged in parallel to each another.

A depth of the first loading recess 711 is preferably equal to or slightly greater than the thickness of the smart card 700. A depth of the second loading recess 612 preferably equal to or slightly greater than thickness of the memory card 600. The battery pack 720 attaches to one side, e.g., a rear surface of the housing 510, to support the smart card 700 detachably received within the first loading recess 711. The memory card 600 is fitted in the second loading portion, i.e., the second loading recess 612.

In an alternative preferred embodiment, fixing members 713, 614, as shown in FIG. 7, may be provided. The fixing members 713, 614 are provided over the first loading recess 711 and the second loading recess 612 to support and/or to secure the smart card 700 and the memory card 600, respectively. The fixing members 713, 614 include bars traversing over the first loading portion, i.e., the first loading recess 711. Further as shown, the bars may traverse over the second loading portion, i.e., the second loading recess 612 along a width direction. In one alternative embodiment, the fixing members 713, 614 may include protrusions, not shown in the figures, extending from upper parts of the first and second loading recesses 711, 612 along a width direction.

Accordingly, the present invention may load various types of cards including memory, e.g., a smart and/or a memory card, in the card-loading socket. Thus, a user may detachably insert specific cards. In addition, the card-loading socket has a very simple configuration, which occupies a very small space and may be manufactured for a low product cost. The first loading portion has the smart card inserted within the first recess. The second loading portion has the memory card inserted in the second recess or opening. Hence, the first and second loading portions are configured for ease of manufacturability and low cost.

In contrast to the first embodiment, the second loading portion having the memory card fitted therein is arranged beneath the first loading portion fitted with the smart card fitted therein. The smart card is loaded on the card-loading socket while covering the memory card. Therefore, both the smart and memory cards may be detachably inserted in the card-loading socket to occupy a minimal space.

It will be apparent to those skilled in the art that various modifications and variations can be made in the present invention. Thus, it is intended that the present invention covers the modifications and variations of this invention provided these modifications come within the scope of the appended claims and their equivalents.

What is claimed is:

1. A mobile communication terminal with a card-loading socket for loading a first card and a second card, the mobile communication terminal comprising:
 a socket body disposed in a housing of the mobile communication terminal comprising a first portion with at least one first electrical terminal and a second portion with at least one second electrical terminal, wherein the at least one first electrical terminal is operatively connected to the first card, and the at least one second electrical terminal is located a predetermined distance from the at least one first electrical terminal and is operatively connected to the second card; and
 a battery pack detachably assembled to one side of the housing,
 wherein at least the at least one first electrical terminal or the at least one second electrical terminal is exposed to the battery pack, the first portion comprises a first recessed area and the second portion comprises a second recessed area within the socket body, and the second recessed area is concave to a bottom of the first recessed area.

2. The mobile communication terminal of claim 1, wherein at least the first card or the second card is a smart card.

3. The mobile communication terminal of claim 1, wherein the predetermined distance is approximately a minimum distance to dispose the first card in the first recessed area and dispose the second card in the second recessed area, so that the at least one first electrical terminal and the at least one second electrical terminal do not overlap.

4. The mobile communication terminal of claim 1, wherein the first card extends over the second card to secure the first card and the second card within the socket body.

5. A mobile communication terminal with a socket for loading a first card and a second card, the mobile communication terminal comprising:
 a housing;
 a first loading portion on a first surface of the housing to detachably receive the first card;
 a second loading portion recessed within the first loading portion to detachably receive the second card;
 a main board within the housing;
 a card-loading socket mounted on the main board, wherein the card-loading socket comprises a first electrical terminal within the first loading portion to contact the first card and a second electrical terminal within the second loading portion to contact the second card; and
 a battery pack detachably assembled to one side of the housing,
 wherein at least the first electrical terminal or the second electrical terminal is exposed to the battery pack, the first loading portion comprises a first recessed area and the second loading portion comprises a second recessed area within the socket body, the first loading portion comprises an upper concave recess on a first surface of the housing, and the second loading portion comprises a lower concave recess on a bottom surface of the first loading portion.

6. The mobile communication terminal of claim 5, wherein the first card is a smart card.

7. The mobile communication terminal of claim 6, wherein the smart card covers at least one portion of the second card secured in the second loading portion when the smart card is disposed in the first loading portion.

8. The mobile communication terminal of claim 6, further comprising a fixing member disposed on the first loading portion to secure the smart card within the first loading portion.

9. The mobile communication terminal of claim 8, wherein the fixing member comprises a bar mounted to traverse the first loading portion.

10. The mobile communication terminal of claim 5, wherein a depth of the first loading portion is approximately equal to or slightly greater than a thickness of the first card and a depth of the second loading portion is approximately equal to or slightly greater than a thickness of the second card.

11. The mobile communication terminal of claim 5, wherein the second loading portion comprises an opening disposed on the bottom surface of the first loading portion to provide communication of electrical signals through the first loading portion.

12. A mobile communication terminal to receive a first card and a second card, the mobile communication terminal comprising:
 a housing;
 a first loading portion on a surface of the housing to detachably receive the first card;
 a second loading portion on the surface of the housing in parallel to the first loading portion to detachably receive the second card;
 a card-loading socket comprising a first terminal and a second terminal, the first terminal exposed to the first loading portion to contact the first card, the second terminal arranged parallel to the first terminal and exposed to the second loading portion to contact the second card; and
 a battery pack detachably assembled to one side of the housing,
 wherein at least the first terminal or the second terminal is exposed to the battery pack, the first loading portion comprises a first recessed area and the second loading portion comprises a second recessed area within the socket body, the first loading portion comprises an upper concave recess on a first surface of the housing, and the second loading portion comprises a lower concave recess on a bottom surface of the first loading portion.

13. The mobile communication terminal of claim 12, wherein the first card is a smart card.

14. The mobile communication terminal of claim 13, further comprising fixing members traversing the first loading portion and the second loading portion to secure the smart card detachably received within the first loading portion and to secure the second card detachably received within the second loading portion.

15. The mobile communication terminal of claim 14, wherein the fixing members comprise bars disposed to traverse over the first loading portion and the second loading portion.

16. The mobile communication terminal of claim 12, wherein a depth of the first loading portion is approximately equal to or slightly greater than a thickness of the first card and a depth of the second loading portion is approximately equal to or slightly greater than a thickness of the second card.

17. The mobile communication terminal of claim 12, further comprising a main board on which the card-loading socket is disposed.

* * * * *